(12) United States Patent
Shin et al.

(10) Patent No.: US 11,990,278 B2
(45) Date of Patent: May 21, 2024

(54) COMPOSITIONS AND METHODS FOR MULTILAYER ELECTRODE FILMS

(71) Applicant: Tesla, Inc., Austin, TX (US)

(72) Inventors: Joon Ho Shin, San Diego, CA (US); Hieu Minh Duong, Rosemead, CA (US)

(73) Assignee: Tesla, Inc., Austin, TX (US)

( * ) Notice: Subject to any disclaimer, the term of this patent is extended or adjusted under 35 U.S.C. 154(b) by 90 days.

(21) Appl. No.: 16/176,420

(22) Filed: Oct. 31, 2018

(65) Prior Publication Data

US 2019/0139714 A1   May 9, 2019

Related U.S. Application Data

(60) Provisional application No. 62/580,956, filed on Nov. 2, 2017.

(51) Int. Cl.
*H01G 11/26* (2013.01)
*H01G 11/04* (2013.01)
(Continued)

(52) U.S. Cl.
CPC ........... *H01G 11/86* (2013.01); *H01G 11/04* (2013.01); *H01G 11/26* (2013.01); *H01G 11/28* (2013.01);
(Continued)

(58) Field of Classification Search
CPC ........ H01M 4/366; H01M 4/38; H01M 10/04; H01M 4/136; H01G 11/86; H01G 11/04;
(Continued)

(56) References Cited

U.S. PATENT DOCUMENTS

| 6,627,252 B1 | 9/2003 | Nanjundiah et al. |
| 7,851,238 B2 | 12/2010 | Mitchell et al. |

(Continued)

FOREIGN PATENT DOCUMENTS

| CN | 102629681 | 8/2012 |
| JP | 2006-210003 | 8/2006 |

(Continued)

OTHER PUBLICATIONS

Yuan et al., "Hierarchical Free-Standing Carbon-Nanotube Paper Electrodes with Ultrahigh Sulfur-Loading for Lithium-Sulfur Batteries", Advanced Functional Materials vol. 24 Issue 39, pp. 6105-6112 (Year: 2014).*

(Continued)

*Primary Examiner* — Milton I Cano
*Assistant Examiner* — Mary G Henshaw
(74) *Attorney, Agent, or Firm* — Knobbe, Martens, Olson & Bear, LLP

(57) ABSTRACT

Provided herein are energy storage device electrode films comprising multiple active layers, and methods of forming such multiple active layer energy storage device electrode films. Each active layer may be a self-supporting active layer comprising a binder and an active material. The binder and/or active material may be the same or different as any other active layer. The active layers may be stacked to form an electrode film, and the electrode film may be laminated with a current collector to form an electrode.

22 Claims, 9 Drawing Sheets

(51) Int. Cl.
  *H01G 11/28* (2013.01)
  *H01G 11/38* (2013.01)
  *H01G 11/50* (2013.01)
  *H01G 11/86* (2013.01)
  *H01M 4/04* (2006.01)
  *H01M 4/136* (2010.01)
  *H01M 4/36* (2006.01)
  *H01M 4/38* (2006.01)
  *H01M 10/04* (2006.01)

(52) U.S. Cl.
  CPC ............ *H01G 11/38* (2013.01); *H01M 4/043* (2013.01); *H01M 4/136* (2013.01); *H01M 4/366* (2013.01); *H01M 4/38* (2013.01); *H01M 10/04* (2013.01); *H01G 11/50* (2013.01)

(58) Field of Classification Search
  CPC ........ H01G 11/26; H01G 11/28; H01G 11/38; H01G 11/50
  See application file for complete search history.

(56) References Cited

U.S. PATENT DOCUMENTS

| | | |
|---|---|---|
| 2004/0085709 A1 | 5/2004 | Nanjundiah et al. |
| 2005/0266298 A1 | 12/2005 | Mitchell et al. |
| 2006/0146479 A1 | 7/2006 | Mitchell et al. |
| 2008/0318133 A1* | 12/2008 | Matsuyama ............ H01M 4/66 429/300 |
| 2010/0248027 A1* | 9/2010 | Zhang ................ H01M 4/0404 427/58 |
| 2011/0177398 A1* | 7/2011 | Affinito ............. H01M 10/0525 429/325 |
| 2012/0121978 A1* | 5/2012 | OKada ................ H01M 10/0525 429/209 |
| 2014/0060723 A1* | 3/2014 | Herle .................. H01M 10/052 156/89.12 |
| 2014/0098463 A1 | 4/2014 | Bendale et al. |
| 2014/0098464 A1 | 4/2014 | Bendale et al. |
| 2014/0098465 A1 | 4/2014 | Bendale et al. |
| 2014/0104752 A1 | 4/2014 | Bendale et al. |
| 2014/0162118 A1 | 6/2014 | Chu et al. |
| 2014/0287304 A1 | 9/2014 | Netz |
| 2014/0363736 A1* | 12/2014 | Kim ..................... H01M 4/133 429/223 |
| 2014/0368973 A1 | 12/2014 | Bouchard et al. |
| 2015/0072234 A1 | 3/2015 | Mitchell et al. |
| 2015/0303481 A1 | 10/2015 | Duong et al. |
| 2016/0099470 A1* | 4/2016 | Kwon ............... H01M 10/0525 429/217 |
| 2017/0092954 A1* | 3/2017 | Manthiram ............. H01M 4/38 |
| 2017/0098826 A1 | 4/2017 | Mitchell et al. |
| 2018/0006291 A1* | 1/2018 | Kim ....................... H01G 11/46 |
| 2019/0312259 A1* | 10/2019 | Baek ..................... H01M 4/366 |

FOREIGN PATENT DOCUMENTS

| | | |
|---|---|---|
| JP | 2014-049240 | 3/2014 |
| WO | WO 01/39293 A2 | 5/2001 |
| WO | WO 11/028251 | 3/2011 |
| WO | WO 17/092954 | 6/2017 |

OTHER PUBLICATIONS

Choi et al. "Multi-layer electrode with nano-Li 4 Ti 5 O 12 aggregates sandwiched between carbon nanotube and graphene networks for high power Li-ion batteries." *Scientific reports* 4 (2014): 7334.

Marsh et al., "Bipolar lithium-ion battery development" Journal of power sources 65(1997):133-141.

Schmitt, M. "Wet film characterization of slot die coated multilayer battery electrodes (Talk)." *16th International Coating Science and Technology Symposium. International Society of Coating Science and Technology, Atlanta, GA.* 2012.

Schmitt et al., "Multilayer slot die coating of Li-ion battery electrodes (Talk)," *17th International Coating Science and Technology Symposium. International Society of Coating Science and Technology, San Diego, CA; Sep. 2014.* Downloaded from http://www.iscst.com/wp-content/uploads/2015/05/Schmitt-Multilayer_Abstract.pdf on Feb. 7, 2019.

Spotnitz, R. "Multilayer Electrode Coatings, Co-extrusion," *STAR Korean Conference*, 2015 RACE, Apr. 28, 2015. Downloaded from https://mdx2.plm.automation.siemens.com/sites/default/files/Presentation/Public%20Use_STAR-KOREA-2016-RMS.pdf on Feb. 7, 2019.

Whitacre et al. "Dual active material composite cathode structures for Li-ion batteries." *Journal of Power Sources* 177(2008):528-536.

Yoshio et al., "Lithium-ion batteries: science and technologies. 2009." Springer.

Woodbank Communications Ltd., Electropaedia. "Battery and Energy Technologies, Cell Construction," 2005. Downloaded from https://www.mpoweruk.com/cell_construction.htm on Feb. 7, 2019.

* cited by examiner

COMPOSITIONS AND METHODS FOR MULTILAYER ELECTRODE FILMS

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57. This application claims the benefit of U.S. Provisional Patent Application No. 62/580,956, filed Nov. 2, 2017, entitled "COMPOSITIONS AND METHODS FOR MULTILAYER ELECTRODE FILMS."

BACKGROUND

Field of the Invention

The present invention relates generally to energy storage devices, and specifically to materials and methods for multilayer electrode films.

Description of the Related Art

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including ultracapacitors. Increasing the operating power and energy of energy storage devices, including capacitors and batteries, would be desirable for enhancing energy storage, increasing power capability, and broadening real-world use cases.

Electrode films combining complimentary attributes may increase energy storage device performance in real-world applications. Furthermore, existing methods of fabrication may impose a practical limit to various structural electrode properties. Thus, new methods to fabricate electrode films with enhanced mechanical properties and increased performance are desirable.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a self-supporting electrode film is provided, wherein the electrode film comprises a plurality of two or more stacked active layers. In some embodiments, the self-supporting electrode film comprises a first active layer and a second active layer, wherein the first active layer and the second active layer have different compositions with respect to each other. In further embodiments, the first active layer and the second active layer are each self-supporting films. In still further embodiments, the first active layer and the second active layer include different active material compositions and/or binder material compositions. In some embodiments, the electrode film is adhered to a current collector, to form an electrode. In some embodiments, no separate adhesive layer is provided between active layers of the multi-layer electrode film, and/or between the multi-layer electrode film and a current collector.

In another aspect, a multilayer electrode film is provided. In some embodiments, the multilayer electrode film includes a first active layer comprising a first active material and a first binder. In some embodiments, the multilayer electrode film includes a second active layer comprising a second active material and a second binder. In some embodiments, the first and second active layers are stacked to form the multilayer electrode film. In some embodiments, the multilayer electrode film is a free-standing film.

In another aspect, a multilayer electrode is provided. In some embodiments, the multilayer electrode includes a current collector comprising a first side and a second side. In some embodiments, the multilayer electrode includes a first multilayer electrode film laminated to the first side of the current collector.

In another aspect, a double sided multilayer electrode is provided. In some embodiments, the double sided multilayer electrode includes a first multilayer electrode. In some embodiments, the double sided multilayer electrode includes a second multilayer electrode film laminated to the second side of the current collector.

In another aspect, a method of fabricating a multilayer electrode is provided. In some embodiments, the method includes providing a first active layer comprising a first active material and a first binder, wherein the first active layer is a free-standing film. In some embodiments, the method includes providing a second active layer comprising a second active material and a second binder, wherein the second active layer is a free-standing film. In some embodiments, the method includes stacking the first active layer to the second active layer to form a multilayer electrode film, wherein the multilayer electrode film is a free-standing film.

In another aspect, a method of fabricating a multilayer electrode is provided. In some embodiments, the method includes fabricating a first multilayer electrode film. In some embodiments, the method includes providing a current collector comprising a first side and a second side. In some embodiments, the method includes laminating the first multilayer electrode film to the first side of the current collector to form a multilayer electrode.

In another aspect, a method of fabricating a multilayer electrode is provided. In some embodiments, the method includes providing a first active layer comprising a first active material and a first binder, wherein the first active layer is a free-standing film. In some embodiments, the method includes providing a second active layer comprising a second active material and a second binder, wherein the first active layer is a free-standing film. In some embodiments, the method includes providing a current collector. In some embodiments, the method includes stacking the first active layer to the second active layer. In some embodiments, the method includes laminating the first active layer to the current collector.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 2A depicts a single sided electrode including n, and at least three, active layers in the electrode film, and FIG. 2B depicts a double sided electrode including n, and at least three, active layers in each electrode film. In FIG. 2B, the active layers on each side of the current collector have the same composition and order.

FIG. 3A depicts a double sided electrode including n, and at least three, active layers in each electrode film. In FIG. 3A, the active layers in the multilayer films on each side of the current collector have a different order from each other. FIG. 3B depicts a double sided electrode including n−1, and at least two, active layers in the electrode film on one side of the current collector, and n, and at least three, active layers in the electrode film on the opposing side.

(FIG. 7B) a trilayer graphite electrode film calendered from three identical active layers, each of 120 μm thickness.

DETAILED DESCRIPTION

Definitions

Figure 1:
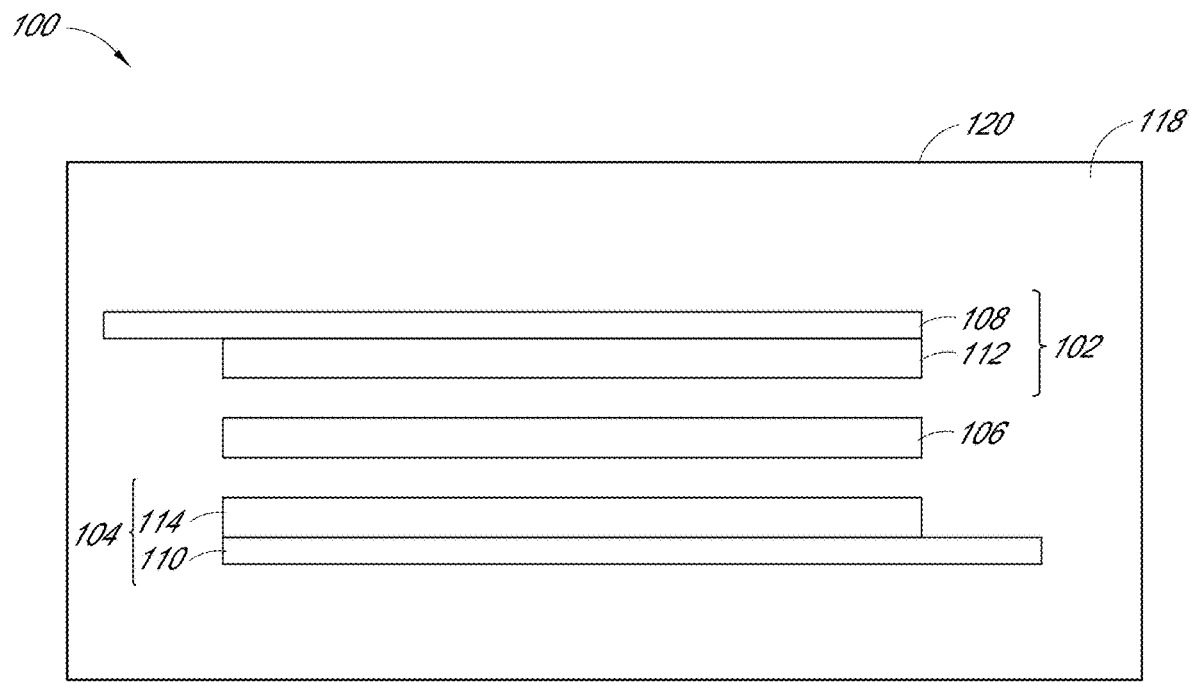
FIG. 1 depicts an embodiment of an energy storage device.

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

As provided herein, a "self-supporting" electrode film or active layer is an electrode film or layer that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements.

As provided herein, a "solvent-free" electrode film is an electrode film that contains no detectable processing solvents, processing solvent residues, or processing solvent impurities. Processing solvents or traditional solvents include organic solvents. A dry electrode film, such as a cathode electrode film or an anode electrode film, may be solvent-free.

A "wet" electrode or "wet process" electrode is an electrode prepared by at least one step involving a slurry of active material(s), binder(s), and processing solvents, processing solvent residues, and/or processing solvent impurities. A wet electrode may optionally include additive(s).

DESCRIPTION

Provided herein are various embodiments incorporating electrode films formed from multiple active layers. An electrode film for use in an energy storage device may be fabricated from a plurality of active layers as provided herein. Further, an energy storage device may be constructed by a method of stacking a plurality of active layers to form an electrode film, as provided herein.

Electrode films may suffer reduced performance due to the mechanical properties of the film components, and interactions therebetween. For example, it is thought that mechanical limitations may result from poor adhesion between an active layer and a current collector, and poor cohesion between active materials and binders. Such processes may lead to losses in performance in both power delivery and energy storage capacity. Without wishing to be limited by theory, it is thought that losses in performance may be due to deactivation of active materials, for example, due to losses in ionic conductivity, in electrical conductivity, or a combination thereof. For example, as adhesion between active layers and current collectors decreases, cell resistance may increase. Decreases in cohesion between active materials may also lead to increases in cell resistance, and in some cases electrical contact may be lost, removing some active material from the ionic and electrical transfer cycles in the cell. Without wishing to be limited by theory, it is thought that volumetric changes in the active materials may contribute to such processes. For example, additional degradation may be observed in electrodes incorporating certain active materials, such as silicon-based materials, that undergo significant volumetric changes during cell cycling. Lithium intercalation-deintercalation processes may correspond to such volumetric changes in some systems. Generally, these mechanical degradation processes may be observed in any electrode, for example a positive electrode or a negative electrode, or in a battery electrode, a capacitor electrode, a hybrid electrode, or other energy storage device electrode.

In wet film-forming processing, such as for example, spraying, slot die, extrusion, and printing, the substrate may limit the possible combinations of active layers under some circumstances. Further, wet processes may suffer from limited material choice, and the resulting wet-processed electrode films may also suffer from a non-uniform dispersion of constituent materials, for example, active materials. The non-uniformity may be exacerbated as film density is increased, and may result in poor ionic and/or electrical conductivity. Wet processes also generally require expensive and time-consuming drying steps, which become more difficult as the film becomes thicker. Thus, the thickness of an electrode film produced by a wet process may also be limited.

Provided herein are multilayer electrode films incorporating two or more active layers. The active layers may each be a self-supporting film that can be handled individually, with two or more active layers stacked to form a single electrode film, and laminated to a current collector to form an electrode. Such multilayer electrode films and their associated processing techniques were found to address some of the problems identified above. For example, the order of active layers may be selected such that higher adhesion films are adjacent to a current collector. For further example, lower adhesion active layers may be sandwiched between higher adhesion active layers such that the effect of the lowered adhesion, for example, to a current collector, is reduced. In some embodiments, the performance, for example, power and/or energy performance, of an electrode film can be tuned by combining multiple active layers with selected properties. Advantageously, multilayer films as provided herein may be cost-effective to manufacture. For example, unlike with wet processing, each active layer can be designed and fabricated in parallel before the final electrode film is assembled from the multiple active layers. Advantageously, electrode films comprising various active layers can easily be assembled and tested to find combinations having desired characteristics. In some instances, active layers may be stacked in selected combinations to cost-effectively meet the needs of bespoke applications.

Active layers combined in an electrode film may be the same or different from each other. Advantageously, multiple stacked instances of active layers of the same composition may allow for fabrication of thicker electrode films than using conventional techniques. Advantageously, defects may be reduced in active layers of a given thickness, which may be stacked to form electrode films having reduced defects, for example inhomogeneities, than an electrode film of the same composition fabricated as a single layer. Further, some instances of multilayer electrode films of three identical active layers may result in a denser electrode film compared to a conventional single layer electrode comprising the same materials. In some embodiments, a multilayer electrode film may have an improved pore structure on the surface of the electrode film compared to a conventional electrode film of similar composition and density. In some instances, stacking active layers of identical composition into a single electrode film may also be more cost effective compared to forming the electrode film as a single layer. Thick electrode film may have use in, for example, medical devices. Thus, a multilayer electrode film provided herein may suitably be for use in a medical device.

Additionally, multilayer electrode films as provided herein were found to have advantages over typical electrode films, for example, electrode films having only a single layer, or having a substantially homogeneous composition throughout. For example, active layers of different compositions may be expected to have different electrical and ionic conductivity. Thus, overall performance of an electrode film may be improved by selecting certain active layers for proximity to a current collector. Additionally, active layers of different compositions may be expected to have different energy and power performance characteristics. Combining active layers of high power and high energy in a single electrode film would be expected to provide the benefits of each type of active layer.

The multilayer electrode films incorporating two or more active layers are generally fabricated by stacking at least one self-supporting dry electrode active layer on another active layer. In some embodiments, an active layer as provided herein is structurally and/or functionally indistinguishable from an electrode film. Thus, each active layer may include an electrode active material and a binder. In some embodiments, each active layer is a self-supporting dry electrode active layer. The self-supporting active layer may be fabricated using dry electrode fabrication techniques. Generally, an active electrode material and a binder are combined, milled, blended, or otherwise processed to form an active layer mixture, and calendered or pressed to form a self-supporting active layer. In some embodiments, the binder is a fibrillizable polymer binder. In further embodiments, the binder comprises, consists essentially, or consists of PTFE. In further embodiments, no solvents are used in any stage of the electrode film fabrication.

Dry electrode fabrication may be advantageous in making multilayer electrode films. Dry electrode fabrication allows self-supporting, for example, free-standing, active layers to be generated. Generally, these active layers can be combined as needed to achieve a set of desired operating characteristics. Thus, self-supporting active layers can be stacked without limitation as to the method of fabricating the individual active layers.

When an energy storage device includes a double sided electrode, i.e., a current collector with electrode films on opposite sides, the two electrode films may be of the same or different composition with respect to each other.

Generally, there are no restrictions on the active layers that can be combined in an electrode film. Thus, each active layer can comprise, for example, the same or different active material, the same or different binder, the same or different thickness, the same or different dimensions, as another active layer in the same electrode film. Generally, the number of active layers that can be combined in a single electrode film is not limited expect by fundamental physical properties, such as compressibility and ionic and/or electrical conductivity, that may restrict the number of active layers in an electrode film of an energy storage device.

In some embodiments, each active layer of a multilayer electrode film as provided herein includes at least one active material and at least one binder. In further embodiments, each active layer of a multilayer electrode film as provided herein is a self-supporting layer. The at least one active material can be any active material known in the art. The at least one active material may include, for example, a carbon material, for example, graphitic material, graphite, graphene-containing materials, activated carbon, hard carbon, soft carbon, and/or carbon nanotubes. The at least one active material may include a battery active material, for example, a metal oxide, metal sulfide, or a lithium metal oxide. For example, the battery active material can include a lithium metal oxide, a layered transition metal oxide, spinel manganese oxide, or olivine. The lithium metal oxide can be lithium nickel manganese cobalt oxide (NMC), lithium manganese oxide (LMO), lithium nickel manganese oxide (LNMO), lithium iron phosphate (LFP), lithium cobalt oxide (LCO), lithium titanate, and/or lithium nickel cobalt aluminum oxide (NCA). The carbon can be porous carbon, graphite, conductive carbon, or a combination thereof. The binder can include PTFE, a polyolefin, poly(ethylene oxide) (PEO), styrene-butadiene, polyvinylene chloride, polyvinylidene chloride (PVDC), polyvinyl chloride (PVC), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). In certain embodiments, the binder comprises, consists essentially, or consists of PTFE. In some embodiments, the binder comprises a fibrillizable polymer.

Multilayer electrode films incorporating two or more active layers as described herein may advantageously exhibit improved performance relative to those including only a single active material layer. The performance may be, for example, Coulombic efficiency, capacity, or conductivity.

The materials and methods provided herein can be implemented in various energy storage devices. As provided herein, an energy storage device can be a capacitor, a lithium ion capacitor (LIC), an ultracapacitor, a battery, or a hybrid energy storage device combining aspects of two or more of the foregoing. In some embodiments, the device is a battery. The energy storage device can be characterized by an operating voltage. In some embodiments, an energy storage device described herein can have an operating voltage of about 2.2 V to about 3.8 V. In further embodiments, the operating voltage can be about 2.7 V to about 3 V, about 3.6 to about 3.7 V, about 2.7 V to about 4.2 V, about 2.7V to about 4.3 V, about 2.7 V to about 4.4 V or any selected values therebetween. In some embodiments, the operating voltage can be about 2.7 V, about 3 V, about 3.6, about 3.7 V, about 4.2 V, about 4.3 V, about 4.4 V or about 4.5V, or any range of values therebetween.

An energy storage device as provided herein includes one or more electrodes. An electrode generally includes an electrode film and a current collector. The electrode film can be comprised of stacked active layers, wherein each active layer can be formed from an active layer mixture of one or more binders and one or more active electrode material(s). It will be understood that an electrode binder, and an electrode including a binder provided herein, can be used in various embodiments with any of a number of energy storage devices and systems, such as one or more batteries, capacitors, capacitor-battery hybrids, fuel cells, or other energy storage systems or devices, and combinations thereof. In some embodiments, an active layer mixture, and an electrode fabricated from an active layer mixture described herein may be a component of a lithium ion capacitor, a lithium ion battery, an ultracapacitor, or a hybrid energy storage device combining aspects of two or more of the foregoing.

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

An energy storage device described herein may advantageously be characterized by reduced rise in equivalent series resistance over the life of the device, which may provide a device with increased power density over the life of the device. In some embodiments, energy storage devices described herein may be characterized by reduced loss of capacity over the life of the device. Further improvements that may be realized in various embodiments include improved cycling performance, including improved storage stability during cycling, and reduced capacity fade.

FIG. 1 shows a side cross-sectional schematic view of an example of an energy storage device 100. The energy storage device 100 may be classified as, for example, a capacitor, a battery, a capacitor-battery hybrid, or a fuel cell.

The device can have a first electrode 102, a second electrode 104, and a separator 106 positioned between the first electrode 102 and second electrode 104. The first electrode 102 and the second electrode 104 may be placed adjacent to respective opposing surfaces of the separator 106. The energy storage device 100 may include an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 may be received within an energy storage device housing 120. One or more of the first electrode 102, the second electrode 104, and the separator 106, or constituent thereof, may comprise porous material. The pores within the porous material can provide containment for and/or increased surface area for reactivity with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, respectively. Electrode films 112 and 114 can have any suitable shape, size and thickness. For example, the electrode films can have a thickness of about 30 microns (μm) to about 250 microns, for example, about 50 microns, about 100 microns, about 150 microns, about 200 microns, about 250 microns, or any range of values therebetween. The electrode films generally comprise one or more active materials. In some embodiments, electrode films 112 and 114, can include active layers comprising binder material and at least one active material. In some embodiments, the at least one active material can include a carbon based material or a battery material. In some embodiments, a battery active material can include a lithium metal oxide and/or a lithium sulfide. In some embodiments, the battery active material may include lithium nickel manganese cobalt oxide (NMC), lithium manganese oxide (LMO), lithium nickel manganese oxide (LNMO), lithium iron phosphate (LFP), lithium cobalt oxide (LCO), lithium titanate, and/or lithium nickel cobalt aluminum oxide (NCA). The electrode films 112 and/or 114 may be multilayer electrode films as provided herein, and having advantageous properties, such as an advantageous thickness, as provided herein. The first electrode 102 and/or the second electrode 104 may be double sided electrodes as provided herein, wherein each electrode comprises electrode films on both sides of the current collector.

The carbon based materials may be selected from graphitic carbon, porous carbon, activated carbon, carbon black, conductive carbon, graphene-containing carbon, graphite, and combinations thereof. Activated carbon can be derived from a steam process or an acid/etching process. In some embodiments, the graphitic carbon can be surface treated carbon.

In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be surface treated carbon.

The first electrode film 112 and/or the second electrode film 114 may also include active layers comprising one or more binders as provided herein. In some embodiments, the binder can include one or more polymers. In some embodiments, the binder can include one or more fibrillizable binder components. The binder component may be fibrillized to provide a plurality of fibrils, the fibrils providing desired mechanical support for one or more other components of the film. It is thought that a matrix, lattice, or web of fibrils can be formed to provide mechanical structure to the electrode film. In some embodiments, a binder component can include one or more of a variety of suitable fibrillizable polymeric materials.

Generally, the active layers and/or electrode films described herein can be fabricated using a modified dry fabrication process. For example, some steps provided herein may be as described in U.S. Patent Publication No. 2005/0266298 and U.S. Patent Publication No. 2006/0146479. These, and any other references to extrinsic documents herein, are hereby incorporated by reference in their entirety. As used herein, a dry fabrication process can refer to a process in which no or substantially no solvents are used in the formation of an electrode film. For example, components of the active layer or electrode film, including carbon materials and binders, may comprise dry particles. The dry particles for forming the active layer or electrode film may be combined to provide a dry particle active layer mixture. In some embodiments, the active layer or electrode film may be formed from the dry particle active layer mixture such that weight percentages of the components of the active layer or electrode film and weight percentages of the components of the dry particles active layer mixture are substantially the same. In some embodiments, the active layer or electrode film formed from the dry particle active layer mixture using the dry fabrication process may be free from, or substantially free from, any processing additives such as solvents and solvent residues resulting therefrom. In some embodiments, the resulting active layer or electrode films are self-supporting films formed using the dry process from the dry particle mixture. In some embodiments, the resulting active layer or electrode films are free-standing films formed using the dry process from the dry particle mixture. A process for forming an active layer or electrode film can include fibrillizing the fibrillizable binder component(s) such that the film comprises fibrillized binder. In further embodiments, a free-standing active layer or electrode film may be formed in the absence of a current collector. In still further embodiments, an active layer or electrode film may comprise a fibrillized polymer matrix such that the film is self-supporting.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 may facilitate electrical coupling between each corresponding electrode film and an external electrical circuit (not shown). The first current collector 108 and/or the second current collector 110 can comprise one or more electrically conductive materials, and have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise an aluminum foil. The aluminum foil can have a rectangular or substantially rectangular shape sized to provide transfer of electrical charge between the corresponding electrode and an external electrical circuit.

In some embodiments, a cathode electrode film of a lithium ion battery or hybrid energy storage device can include about 70 weight % to about 95 weight % of the at least one active material, including about 70 weight % to about 92 weight %, or about 70 weight % to about 88 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise at least one active material, a binder, and optionally a conductive additive. In some embodiments, the conductive additive may comprise a conductive carbon additive, such as carbon black. In some embodiments, the at least one active material of the anode may comprise synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 94 weight % of the at least one active material, including about 80 weight % to about 92 weight %, or about 80 weight % to about 90 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 1.5 weight % to 3 weight %. In some embodiments, the anode electrode film comprises about 1.5 weight % to about 3 weight % binder. In some embodiments, the anode film may not include a conductive additive.

Some embodiments include an electrode film, such as of an anode and/or a cathode, having one or more active layers comprising a polymeric binder material. In some embodiments, the binder may comprise PTFE and optionally one or more additional binder components. In some embodiments, the binder may comprise one or more polyolefins and/or co-polymers thereof, and PTFE. In some embodiments, the binder may comprise a PTFE and one or more of a cellulose, a polyolefin, a polyether, a precursor of polyether, a polysiloxane, co-polymers thereof, and/or admixtures thereof. In some embodiments, the binder can include branched polyethers, polyvinylethers, co-polymers thereof, and/or the like. The binder can include co-polymers of polysiloxanes and polysiloxane, and/or co-polymers of polyether precursors. For example, the binder can include poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). An admixture of polymers may comprise interpenetrating networks of the aforementioned polymers or co-polymers.

The binder may include various suitable ratios of the polymeric components. For example, PTFE can be up to about 98 weight % of the binder, for example, from about 20 weight % to about 95 weight %, about 20 weight % to about 90 weight %, including about 20 weight % to about 80 weight %, about 30 weight % to about 70 weight %, or about 30 weight % to about 50 weight %.

In some embodiments, the at least one active material includes a treated carbon material, where the treated carbon material includes a reduction in a number of hydrogen-containing functional groups, nitrogen-containing functional groups and/or oxygen-containing functional groups, as described in U.S. Patent Publication No. 2014/0098464. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

Multilayer electrodes described herein may be used separately or in combination in an energy storage device to enable operation under the selected conditions.

Lithium Ion Energy Storage Device

In some embodiments, energy storage device 100 can be a lithium ion energy storage device such as a lithium ion capacitor or a lithium ion battery. In some embodiments, the electrode film of a lithium ion energy storage device electrode can comprise one or more carbon materials, and a fibrillized binder matrix as provided herein.

In some embodiments, an electrode film of an anode of a lithium ion battery or hybrid energy storage device can comprise an anode active material. Anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx.).

In some embodiments, an electrode film of a cathode of a lithium ion battery or hybrid energy storage device can comprise a cathode active material, a binder, optionally a porous carbon material, and optionally a conductive additive. In some embodiments, the conductive additive may comprise a conductive carbon additive, such as carbon black. In some embodiments, the porous carbon material may comprise activated carbon. In some embodiments, a cathode active material can include a lithium metal oxide and/or a lithium sulfide. In some embodiments, a cathode active material may include lithium nickel manganese cobalt oxide (NMC), lithium manganese oxide (LMO), lithium nickel manganese oxide (LNMO), lithium iron phosphate (LFP), lithium cobalt oxide (LCO), lithium titanate, and/or lithium nickel cobalt aluminum oxide (NCA). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 10 $mAh/cm^2$. In some embodiments, the cathode film comprising a sulfur or a material including sulfur active material has an electrode film density of 1 $g/cm^3$. In some embodiments, the cathode film comprising a sulfur or a material including sulfur active material further comprises a binder. In some embodiments, the binder of the cathode film comprising a sulfur or a material including sulfur active material is selected from polytetrafluoroethylene (PTFE), polyvinylidene fluoride (PVDF), poly(ethylene oxide) (PEO), polyethylene (PE), polyacrylic acid (PAA), gelatin, other thermoplastics, or any combination thereof.

In some embodiments, the electrode film of a lithium ion energy storage device electrode comprises an active material configured to reversibly intercalate lithium ions. In some embodiments, the lithium intercalating active material is graphite, hard carbon and/or soft carbon. For example, the electrode film of the electrode can include a binder material, one or more of graphite, graphene-containing carbon, hard carbon and soft carbon, and an electrical conductivity promoting material. In some embodiments, an electrode is pre-doped with lithium ions.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate (LiPF$_6$), lithium tetrafluoroborate (LiBF$_4$), lithium perchlorate (LiClO$_4$), lithium bis(trifluoromethansulfonyl)imide (LiN(SO$_2$CF$_3$)$_2$), lithium trifluoromethansulfonate (LiSO$_3$CF$_3$), lithium bis(pentafluoroethanesulfonyl)imide (C$_4$F$_{10}$LiNO$_4$S$_2$) (LiBETI) and lithium bis(fluorosulfonyl)imide (F$_2$LiNO$_4$S$_2$) (LiFSI), and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, about 1.3 M, about 1.4 M, about 1.5 M, or any range of values therebetween.

In some embodiments, an energy storage device provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise LiPF$_6$, and one or more carbonates.

In some embodiments, the energy storage device 100 is a lithium ion battery or hybrid energy storage device including a cathode comprising at least one cathode active material. In some embodiments, the lithium ion battery is configured to operate at about 2 to 4.5V, about 3 to 4 V, or about 3.6 to 3.7 V.

In some embodiments, an energy storage device is a battery including one or more multilayer electrodes as described herein and configured for operation at −30° C. to about 70° C., for example, 30° C., −20° C. −10° C., 0° C., 10° C., 20° C., 30° C., 40° C., 50° C., 60° C., 70° C., or any range of values therebetween. In some embodiments, the energy storage device is configured for operation at temperatures of greater than 70° C.

Ultracapacitor

In some embodiments, energy storage device 100 can be an ultracapacitor configured to operate at about 2.7 V, 2.8 V, 2.9 V, 3 V, or greater than 3 V, or any range of values therebetween.

The energy storage device 100 can be charged with any suitable electrolyte. For example, device 100 can include a solvent and a salt including a cation and an anion. The cation can be a quaternary ammonium cation. In some embodiments, the quaternary ammonium cation can be selected from tetraalkylammoniums. In some embodiments, the tetraalkylammonium cation can be selected from cyclic ammoniums, for example, spiro-(1,1')-bipyrrolidinium, and acyclic ammoniums, for example, triethylmethyl ammonium, triethylbenzylammonium, and tetraethyl ammonium. The quaternary ammonium salt can include an anion selected from the group consisting of hexafluorophosphate, tetrafluoroborate and iodide. The cation of the electrolyte salt can include a symmetrical, for example, cation spiro-(1,1')-bipyrrolidinium. In some embodiments, the cation of the electrolyte salt can include an asymmetrical cation, for example, triethylmethyl ammonium. In some embodiments, the salt can include a spiro compound, for example a symmetrical or an unsymmetrical spiro compound. For example, the spiro compounds can be an N-spirobicyclic compound, including one or more 4-, 5-, 6-, or 7-membered rings. A symmetrical spiro cation can be spiro-(1,1')-bipyrrolidinium tetrafluoroborate. In some embodiments, the salt can include an asymmetrical spiro compound having unequally sized rings, or different substitution on equally sized rings. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or any range of values therebetween.

In some embodiments, an energy storage device provided herein can include a liquid solvent. A solvent as provided herein need not dissolve every component, and need not completely dissolve any component, of the electrolyte. In further embodiments, the solvent can be an organic solvent. In some embodiments, a solvent can include one or more functional groups selected from nitriles, carbonates, ethers and/or esters. In some embodiments, the solvent can comprise a nitrile, for example, as acetonitrile. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise a quaternary ammonium salt and acetonitrile.

In further embodiments, the ultracapacitor includes an electrolyte comprising a quaternary ammonium salt with a concentration of less than 1 molar (M), as described in U.S. Patent Publication No. 2014/0104752, the entire contents of which are hereby incorporated herein by reference. In still further embodiments, the ultracapacitor includes a protective coating disposed on an inner housing surface, as described in U.S. Patent Publication No. 2014/0098463, the entire contents of which are hereby incorporated herein by reference. In yet further embodiments, the ultracapacitor includes a positive electrode or a negative electrode comprising a carbon based layer having a selected porosity, for example, mesoporosity or microporosity, as described in U.S. Patent Publication No. 2014/0098465, the entire contents of which are hereby incorporated herein by reference. In some embodiments, the ultracapacitor includes electrolyte in an amount that is selected to correspond to the saturation quantity of components of the ultracapacitor as described in U.S. Patent Publication No. 2014/0368973, the entire contents of which are hereby incorporated herein by reference.

In some embodiments, an energy storage device is an ultracapacitor including one or more multilayer electrodes as described herein configured to operate at 3 volts or greater.

In further embodiments, the ultracapacitor is configured to operate at 2.7 volts or greater. In some embodiments, the ultracapacitor is configured for operation at selected conditions of voltage and temperature. For example, the ultracapacitor can be configured for operation at 50° C., 55° C., 60° C., 65° C., 70° C., 75° C., 80° C., 85° C., 90° C., 95° C., 100° C., or greater temperatures, or any range of values therebetween. The ultracapacitor can be configured for continual operation at 2.7 V at 60 to 85° C., 2.8 V at 60 to 85° C., 2.9 V at 60 to 85° C., or 3 V at 60 to 85° C., or any selected temperature values therebetween. In some embodiments, the conditions of voltage and temperature are about 2.7 V and about 85° C., about 2.8 V and about 80° C., about 2.9 V and about 75° C., about 3 V and about 70° C., or about 3.1 V and about 65° C. In some embodiments, the ultracapacitor is configured for an operating voltage of about 2.7 to 3 volts at a temperature of at least about 65° C. for at least 500 k cycles. In some embodiments, no significant electrode decomposition occurs in an ultracapacitor following about 1500 hours of operation and/or at least 500 k cycles, where significance is determined by intervention of an adverse effect requiring operation under less than the rated conditions of the device.

The ultracapacitor may include one or more multilayer electrodes as described herein to enable the ultracapacitor to maintain a capacitance greater than about 80% of its initial capacitance, and/or less than 200% of its initial equivalent series resistance when operating at a voltage of about 2.7 to 3 volts over a period of about 1,500 hours, and/or at least 500 k cycles, and at a temperature of at least about 65° C. In other embodiments, the ultracapacitor is configured to maintain at least 75%, 85%, 90%, 95% or 99% of its initial capacity when operating for a period of at least 1500 hours, and/or at least 500 k cycles at about 65° C. or greater.

Multilayer Electrode Films

Provided herein are compositions and methods for electrode films comprised of multiple active layers.

Figure 2A:
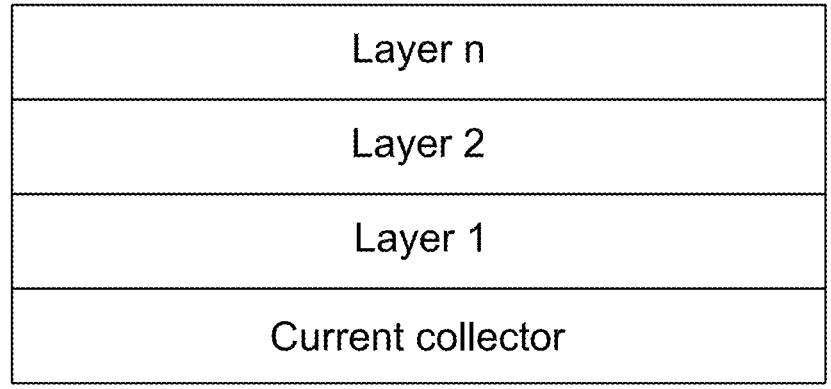
FIGS. 2A and 2B depict multilayer (Layer 1 to Layer n) film structures incorporated in electrodes.
Figure 2B:
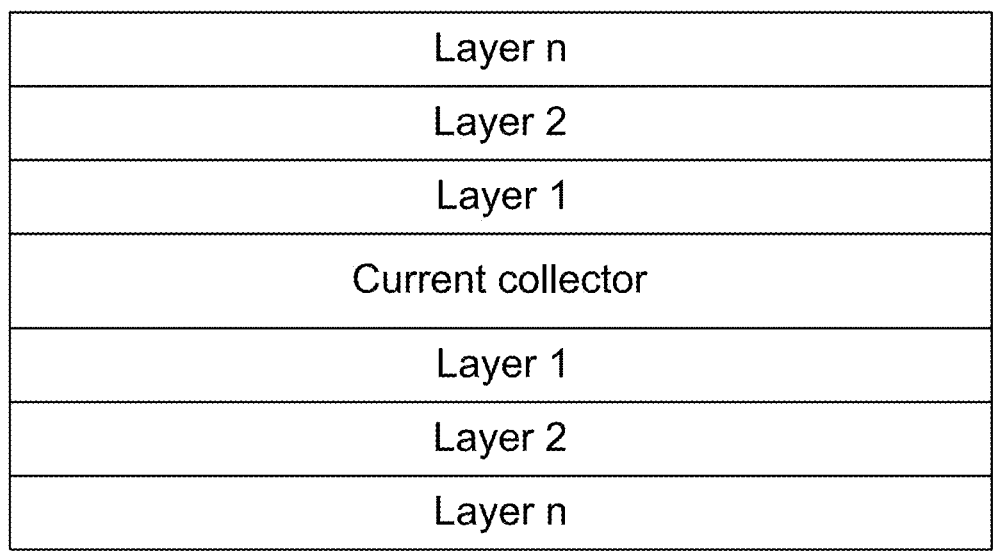

Various embodiments of multilayers electrode films as provided herein are presented in FIGS. 2A-2B and FIGS. 3A-3B. FIGS. 2A and 2B depict multilayer (Layer 1 to Layer n) film structures incorporated in electrodes. FIG. 2A depicts a single sided electrode including at least three active layers in the electrode film, and FIG. 2B depicts a double sided electrode including at least three active layers in each electrode film. In FIG. 2B, the active layers on each side of the current collector have the same composition and order. FIG. 2B depicts a symmetrical double sided electrode comprising multilayer electrode films.

Figure 3A:
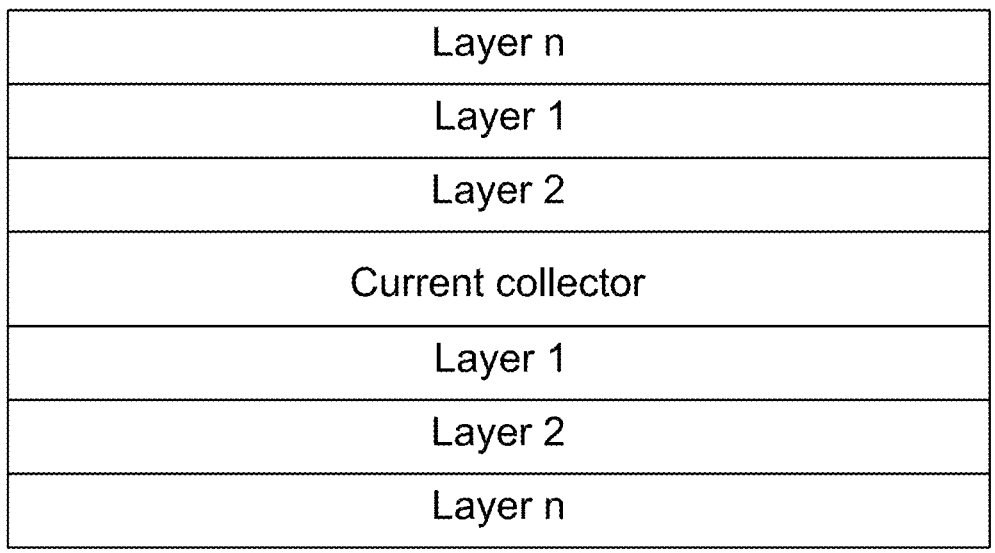
FIGS. 3A and 3B depict multilayer (Layer 1 to Layer n, and to Layer n−1) film structures incorporated in electrodes.
Figure 3B:
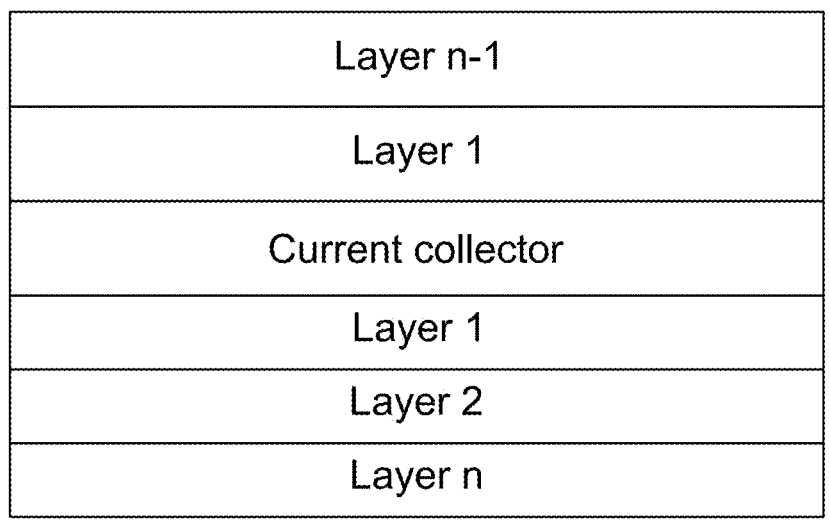

FIGS. 3A and 3B depict multilayer (Layer 1 to Layer n) film structures incorporated in electrodes. FIG. 3A depicts a double sided electrode including n, and at least three, active layers in each electrode film. In FIG. 3A, the active layers in the multilayer films on each side of the current collector have a different order from each other. For example, the active layers that are immediately adjacent to each corresponding side of the current collector for each corresponding multilayer film can have a different composition with respect to each other. FIG. 3B depicts a double sided electrode including n−1, and at least two, active layers in the electrode film on one side of the current collector, and n, and at least three, active layers in the electrode film on the opposing side. As such, FIG. 3B shows a double sided multilayer electrode with a first multilayer electrode film that comprises a different number of layers than a second multilayer electrode film. FIGS. 3A and 3B depict asymmetrical double sided electrodes comprising multilayer electrode films. It will be understood that the embodiments shown in FIGS. 2B, 3A and 3B can be modified to include different numbers of layers. For example, the multilayer electrode films shown that have three or more layers may have two or more layers. Some of the embodiments may have only a single (non-multi-layer) active film on one side of the current collector, and a multi-layer film on the other. Additionally, any of the layers shown may have the same or different compositions with respect to each other. For example, although "Layer 1" is shown to indicate a different layer adjacent to, and on each side of the current collector in FIG. 2B, the chemical composition of each Layer 1 can be the same or different with respect to the other. Also, bipolar multilayer configurations of the embodiments shown in FIGS. 2B-3B for use in bipolar energy storage device configurations are within the scope of the invention. For example, the Layer 1, Layer 2, and Layer n shown above the current collector in FIG. 2B can be a positive polarity, whereas the Layer 1, Layer 2, and Layer n shown below the current collector in FIG. 2B can be a negative polarity, and vice versa, and similarly for FIGS. 3A and 3B. In bipolar energy storage device configurations, the cells are stacked in a sandwich construction so that the negative current collector of one cell is also used as the positive current collector of the next cell over. In this way, double sided electrodes are shared by two series-coupled electrochemical cells such that one side of the double sided electrode acts as an anode in one cell and the other side of the double sided electrode acts as a cathode in the next cell. The anode and cathode polarities of the double sided electrodes are separated by the shared current collector that acts as an electron-conducting membrane and series connection, and serves as a partition preventing the flow of ions between the cells.

Generally, an active layer may include one active material, or may be a composite active layer including two or more active materials. For example, a composite active layer may include a higher energy active material, for example, silicon, along with a higher power active material such as carbon, for example, graphite. For example, silicon may have about 4000 mA-h/gram, or up to about 4200 mA-h/gram, and graphite may have about 300 mA-h/gram, or up to about 370 mA-h/gram. These materials may be employed in a multi-layer electrode film, as described further herein, in different ratios with respect to two different active layers. For example, a first layer may have increased silicon, relative to a second layer, for increased energy, and a second layer may have increased graphite, relative to the first layer, for increased power.

Generally, a multilayer electrode film is prepared by stacking and/or lamination of a plurality of active layers to form an electrode film, and the electrode film may be laminated to a current collector. A self-supporting electrode film may be assembled, for example, from stacked active layers, before being laminated on a current collector, or the active layers may be laminated on a current collector individually, in groups, and/or in sequence. For example, two active layers may be stacked to form a self-supporting electrode film, and the electrode film may be laminated to a current collector to form an electrode. Alternatively or in addition, a single, first active layer may be laminated to a current collector, and a second active layer may be stacked on the first active layer to form an electrode film in contact with a current collector. Generally, the assembly steps described herein may be performed on a current collector of a double sided electrode or a single sided electrode. Thus, a lamination step may be performed on a current collector in contact with one or more active layers or an electrode film.

The active layers or electrode film may be on the same or an opposing side of the current collector.

A multilayer electrode film may have a selected thickness suitable for certain applications. The thickness of an operable multilayer electrode film may be greater than that of an electrode film prepared by conventional processes. In some embodiments, the multilayer electrode film can have a thickness of about, or at least about, 250 microns, about 300 microns, about 350 microns, about 400 microns, about 450 microns, about 500 microns, about 750 microns, or about 1 mm, or any range of values therebetween. An electrode comprising one or more multilayer electrode films can have a thickness of about, or at least about, 500 microns, about 750 microns, or about 1 mm, or about 2 mm, or any range of values therebetween.

An active layer as provided herein can be fabricated from two or more stacked, identical or substantially identical, active prelayers. In some embodiments, the active prelayers may be free-standing, self-supporting films as provided herein.

Multilayer electrode films can include, for example, a high power active layer, a high energy active layer, a high loading active layer, a hybrid active layer, or combinations thereof. A high energy active layer may include active materials characterized by relatively greater capacity. A high power active layer may include active materials characterized by relatively greater delivery capacity. A high loading active layer may include a high content of active material in an active layer and/or a high loading of active layer in an electrode film, compared to an electrode film prepared using conventional materials and methods. A hybrid active layer may include two or more materials selected from high energy, high power, or high loading. The high power active material may comprise, for example, hard carbon. The high energy active material may comprise, for example, Si or Si—C. The hybrid layer may comprise, for example, Sn, Sn—C, Si, or Si—C.

In general, the order of stacking of active layers in an electrode film is not particularly restricted, and the composition of any active layer may be the same or different than the composition of any other active layer in an electrode film. Thus, a bilayer film of a current collector and two active layers A and B, may have the order: Collector-A-B, or Collector-B-A; moreover, active layers A and B may have the same or different composition. A trilayer film of a current collector and three active layers A, B, and C, may have the order: Collector-A-B-C, Collector-A-C-B, Collector-B-C-A, Collector-B-A-C, Collector-C-B-A, or Collector-C-A-B; moreover, in each of the above active layer orderings, A may be of the same or different composition as B or C, B may be of the same of different composition as C or A, and C may be of the same of different composition as A or B. In certain embodiments, A, B, and/or C, may be selected from a high power active layer, a high energy active layer, a high loading active layer, a hybrid active layer, or a combination thereof.

Generally, each stacking and/or lamination step may be performed at different temperature(s). Generally, the compression ratio, the number of lamination iterations, and the lamination temperature(s) also influence the properties of the final electrode film. For example, it is thought that adhesion between layers may be affected by lamination temperature(s).

The active layer mixture can be processed by a high shear and/or high pressure process. The high shear and/or high pressure process may include jet-milling, blending, etc. The processing time and/or feed rate generally will have an effect on the final particle size of the binder and/or active material(s). In some embodiments, the active layer and/or electrode film so formed is a self-supporting active layer and/or electrode film.

In some embodiments, the active layer mixture may include binder particles having selected sizes. In some embodiments, the binder particles may be about 50 nm, about 100 nm, about 150 nm, about 200 nm, about 250 nm, about 300 nm, about 350 nm, about 400 nm, about 450 nm, about 500 nm, about 1 µm, about 5 µm, about 10 µm, about 50 µm, or any range of values therebetween.

In some embodiments, the number of layers in a multilayer electrode film may be selected from the desired electrode film thickness and the thickness of each active layer.

In some embodiments, the active layer mixture is subjected to one or more dry electrode process(es), such as that described in U.S. Patent Publication No. 2015/0072234. In some embodiments, a dry electrode is provided, wherein the dry electrode is free from processing contaminants such as solvents, and wherein the dry electrode is prepared by the methods and materials provided herein.

In some embodiments, an electrode fabricated using the materials and methods described herein can be characterized by improved performance. In further embodiments, the capacity of a multilayer electrode film comprising a first active layer and a second active layer is greater than either of the first active layer and the second active layer individually. In further embodiments, the Coulombic efficiency of a multilayer electrode film comprising a first active layer and a second active layer is greater than either the first active layer or the second active layer individually.

In some embodiments, a method for fabricating an energy storage device comprising a multilayer electrode film is provided. In further embodiments, the method comprises stacking a first self-supporting active layer and a second self-supporting active layer to form a stack, pressing or calendering the stack to form a multilayer electrode film, and optionally laminating the multilayer electrode film to a current collector to form an electrode. The methods of calendering or pressing stacked active layers to form an electrode film, and laminating stacked active layers to a current collector are generally those known in the art.

Figure 4A:
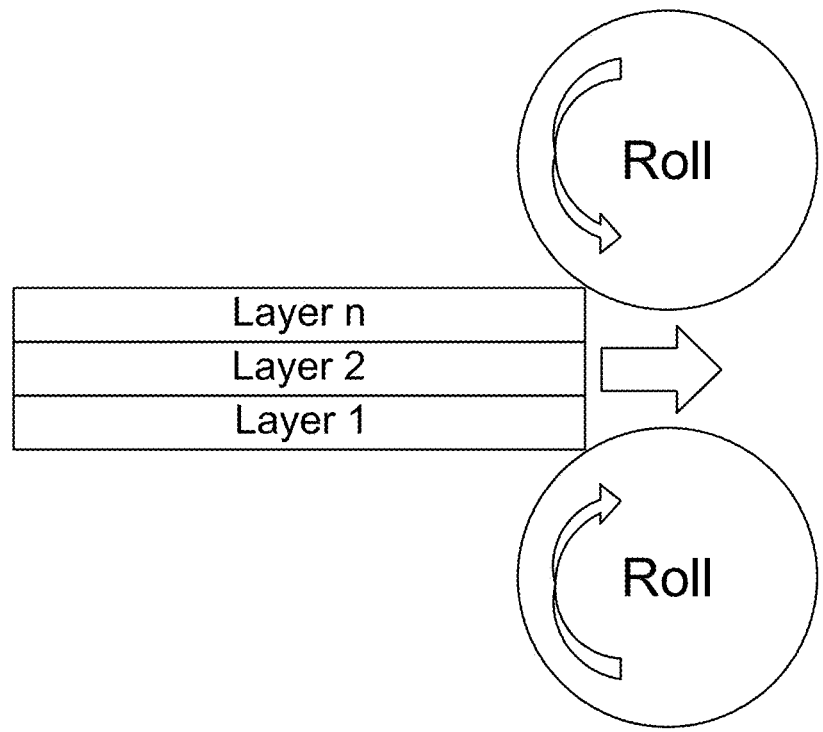
FIG. 4A depicts a calendering processes for stacking active layers to each other.
Figure 4B:
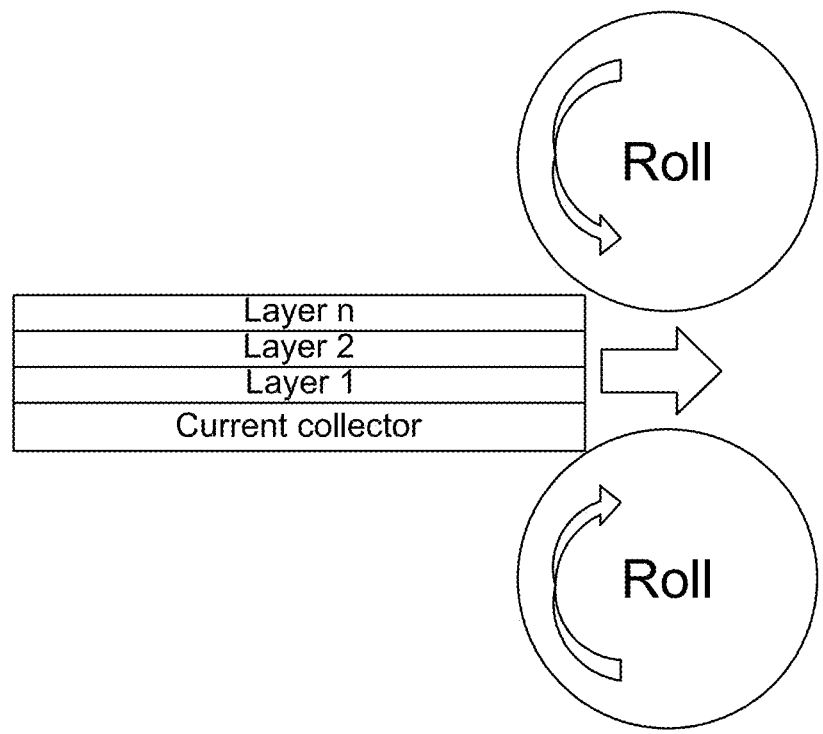
FIG. 4B depicts a calendering process for laminating a multilayer film to a current collector.

FIG. 4A depicts a rolling, for example, calendering processes for stacking active layers to each other. FIG. 4B depicts a rolling, for example, calendering process for laminating a multilayer film to a current collector.

Figure 5A:
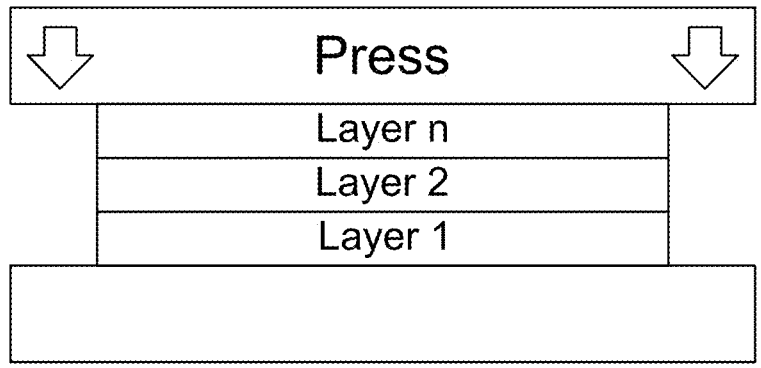
FIG. 5A depicts a pressing process for stacking active layers to each other.
Figure 5B:
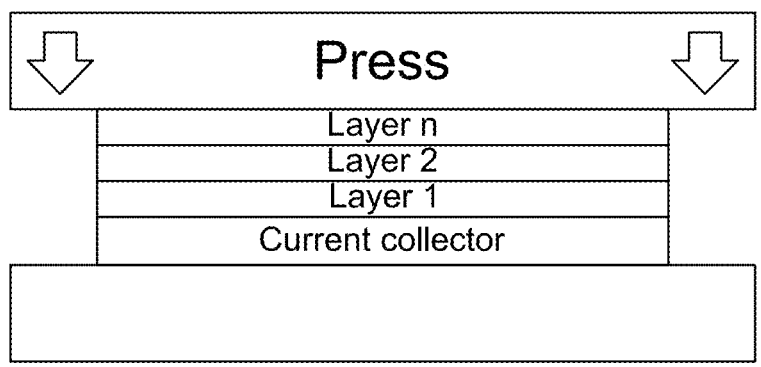
FIG. 5B depicts a pressing process for laminating a multilayer film to a current collector.

FIG. 5A depicts a pressing process for stacking active layers to each other. FIG. 5B depicts a pressing process for laminating a multilayer film to a current collector.

Generally, the process for fabricating an active layer is not different from that for fabricating an electrode film using dry electrode fabrication techniques. For example, such techniques may be as described in U.S. Patent Publication No. 2005/0266298 and/or U.S. Patent Publication No. 2006/0146479. These, and any other references to extrinsic documents herein, are hereby incorporated by reference in their entirety.

In some embodiments, a self-supporting electrode film is provided, wherein the electrode film comprises stacked active layers as provided herein. In further embodiments, the first active layer and the second active layer are self-supporting films. In some further embodiments, the self-supporting electrode film comprises a first active layer and a second active layer, wherein the first active layer and the second active layer have different compositions. In still further embodiments, the first active layer and the second active layer include different active material compositions and/or binder material compositions.

Figure 6:
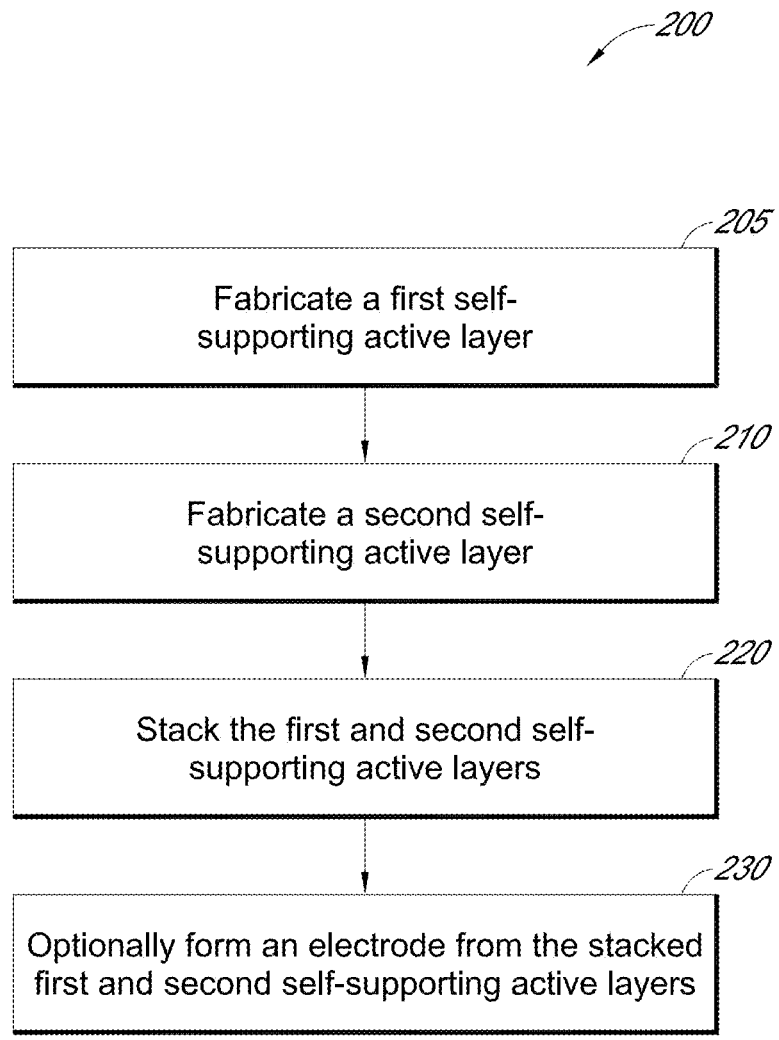
FIG. 6 provides a flow chart depicting a method for fabricating a multilayer electrode film as provided herein.

FIG. 6 provides a flow chart depicting a method 200 for fabricating a multilayer electrode film as provided herein. In box 205, a first self-supporting active layer is fabricated. The first self-supporting active layer may be fabricated by any suitable method. Generally, the method of fabrication may be a dry electrode fabrication process. Generally, the method of fabrication of a self-supporting dry active layer is similar to that of a self-supporting dry electrode film. In some embodiments, the first self-supporting active layer may be a high energy layer, a high power layer, a high loading layer, or a hybrid layer as provided herein.

In box 210, a second self-supporting active layer is fabricated. The second self-supporting active layer may be fabricated by any suitable method. Generally, the method of fabrication may be a dry electrode fabrication process. The second self-supporting active layer may be of the same or different composition from the first self-supporting active layer. The method of fabrication of the second self-supporting active layer may be the same or different from that of the first self-supporting active layer. In some embodiments, the second self-supporting active layer may be a high energy layer, a high power layer, a high loading layer, or a hybrid layer as provided herein.

In box 220, the first and second self-supporting active layers are stacked. Stacking of a first layer to a second layer describes adhering the layers to each other without an intervening layer between them, for use on the same side of a current collector of an electrode. Stacking may comprise laminating the first layer and second layer to each other. Stacking may comprise laminating the one of the two layers to the other of the two layers in the absence of a current collector, or may comprise laminating a first layer to a second layer that has been previously laminated to a current collector in a separate step. Stacking the first and second self-supporting active layers may comprise a calendering or pressing process to adhere the two layers to each other. The combined multilayer film may have a thickness that is approximately the sum of the thicknesses of the two individual pre-stacked layers, or may be less than the sum of the thicknesses of the two layers.

In box 230, an electrode is formed from the stacked active layers. Forming an electrode may comprise laminating the stacked active layers formed in box 220 to a current collector. In some embodiments, forming an electrode from the stacked active layers may comprise laminating, such as adhering, the stacked active layers to a current collector including an adhesive layer. In further embodiments, forming an electrode from the stacked active layers may comprise laminating the stacked active layers to a current collector without using an adhesive. In further embodiments, forming an electrode from the stacked active layers may comprise laminating the stacked active layers to a current collector with the use of an adhesive. Method 200 can include additional steps of forming a third or more self-supporting layer (like steps 205 and 210), and stacking a third or more additional self-supporting active layers (like step 220). A final multi-layer electrode film can be formed upon completion of step 220, or for electrode films with more than two layers, after any additional self-supporting active layers are stacked upon the first and second layers. In some embodiments, steps 220 and 230 can be completed concurrently. For example, first and second self-supporting active layers can be formed in steps 205 and 210, and one of these two layers can be subsequently attached to a current collector prior to performing the stacking step 220. Subsequently, the first and second layer, with the current collector attached to one of the two layers, can be concurrently laminated to complete the stacking step 220 and the forming an electrode film step 230.

Example 1

Figure 7A:
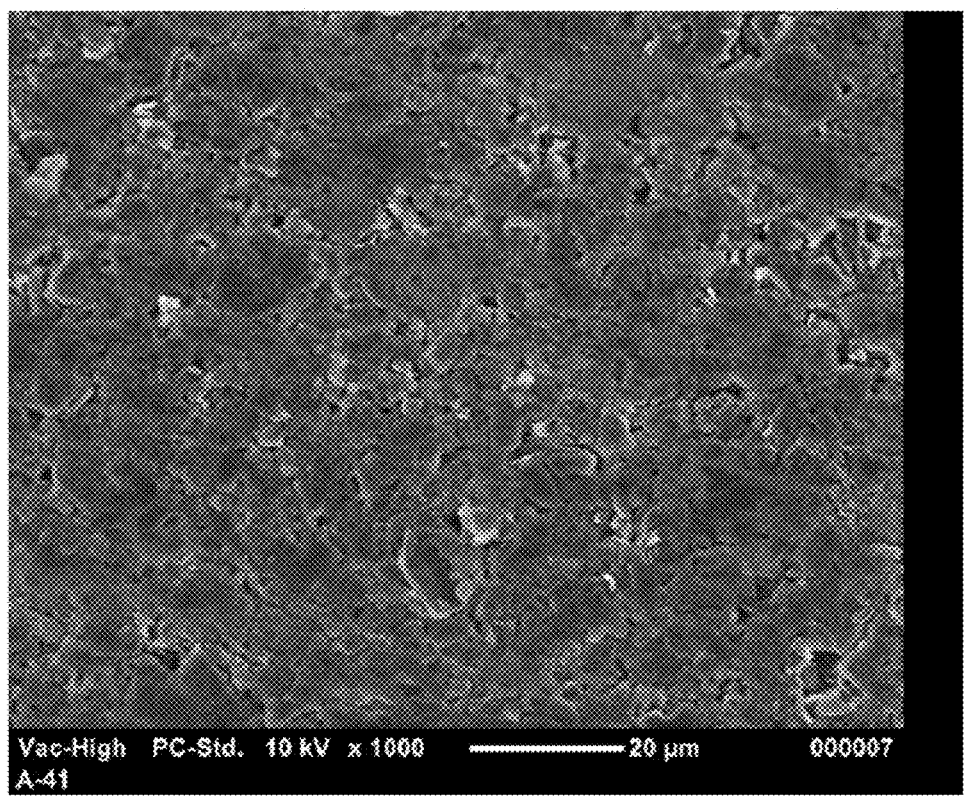
FIGS. 7A-7B depict the surface morphology of (FIG. 7A) a single layer graphite electrode of 120 μm thickness.
Figure 7B:
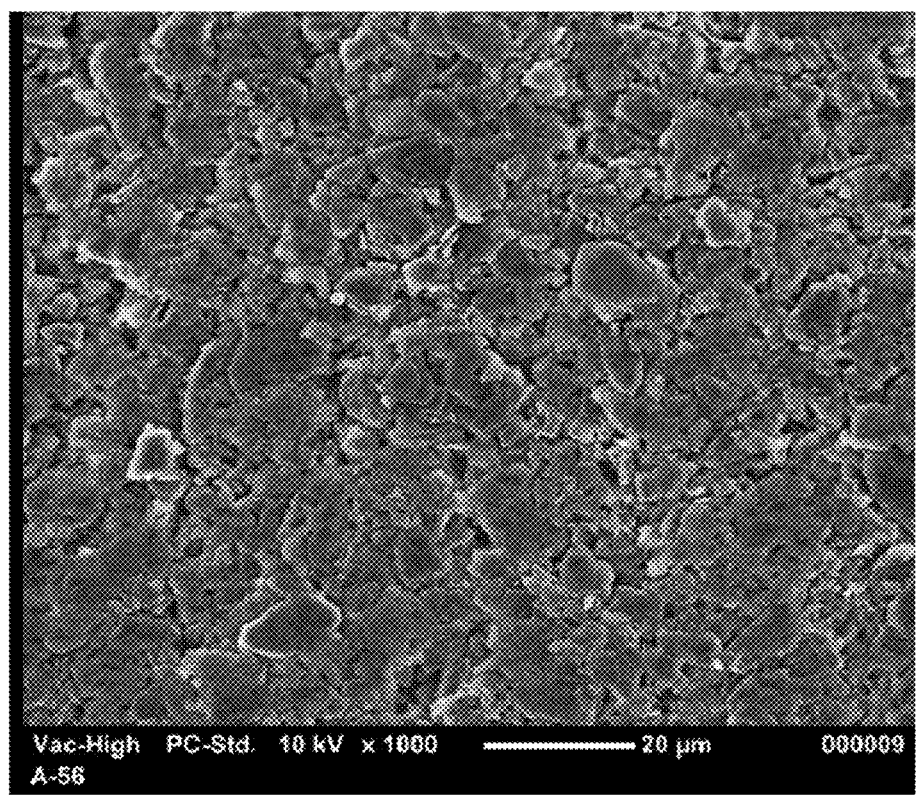

A first self-supporting, single layer electrode film of 120 μm thickness comprising graphite as active material was fabricated by typical dry electrode techniques as a comparative sample. A second, self-supporting multilayer electrode film comprising three identical active layers, each of 120 μm thickness and of graphite active material, was fabricated according to the disclosure. SEM images were taken of the first electrode film, as seen in FIG. 7A, and the second electrode film, as seen in FIG. 7B, showing uniform surface morphology. As can be seen in FIGS. 7A-7B, the multilayer electrode (FIG. 7B) displayed open pores in the surface of the electrode film, which is important for wetting with liquid electrolyte, and is expected to improve electrode performance. A conventional single layer electrode (FIG. 7A) had fewer surface pores, which is expected to limit electrolyte diffusion toward the interlayer of the electrode film. The multilayer electrode film of FIG. 7B retained its density despite displaying desirable pore structure.

Example 2

Figure 8A:
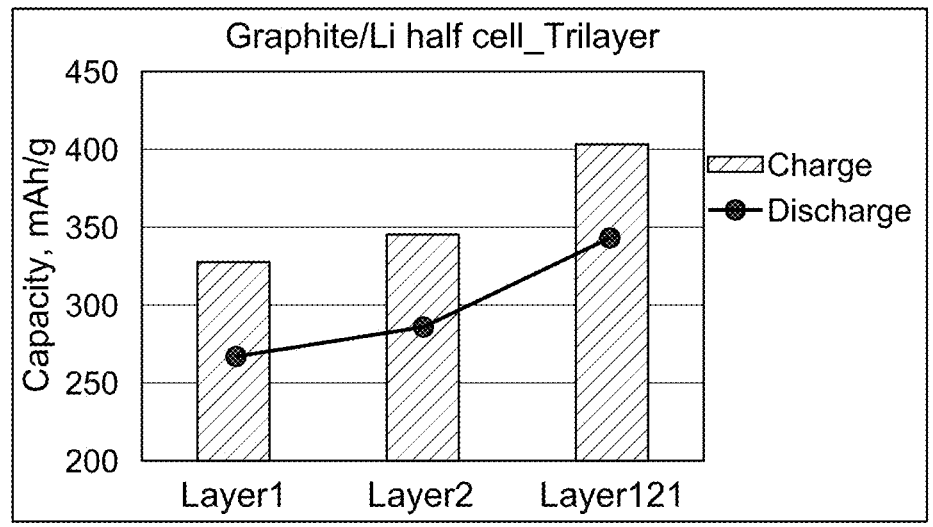
FIGS. 8A-8B depict capacity and efficiency, respectively, of two single layer graphite electrode films of different compositions ("Layer1" and "Layer2"), and a trilayer graphite ("Layer121") electrode film.
Figure 8B:
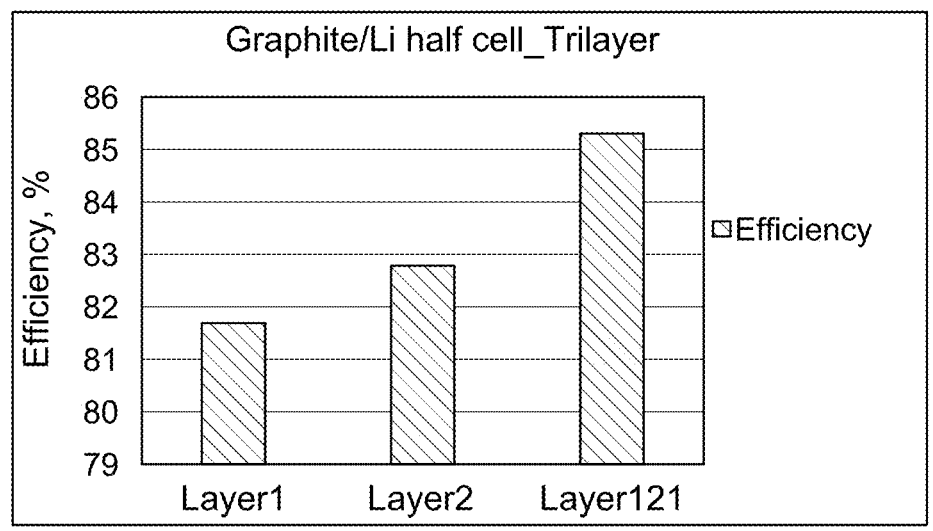

Three graphite electrode films were prepared as follows. A first electrode film included graphite, 3% weight CMC and 3% weight PTFE ("Layer1"), a second film included graphite, 3% weight polyvinyl chloride (PVC) and 3% weight PTFE ("Layer2"). A third multilayer electrode film was prepared and included three active layers in the following configuration: Layer1-Layer2-Layer1 ("Layer121"). Film thickness of the electrode films Layer1, Layer2 and Layer121 were 132 μm, 132 μm and 256 μm, respectively. FIGS. 8A-8B provide capacity and efficiency data as measured for the Layer1, Layer2, and Layer121 electrode films.

As seen in FIG. 8A, Layer1 was found to have a charge capacity of about 325 mAh/g and a discharge capacity of about 275 mAh/g; Layer2 was found to have a charge capacity of about 350 mAh/g and a discharge capacity of about 300 mAh/g; and Layer121 was found to have a charge capacity of about 400 mAh/g and a discharge capacity of about 350 mAh/g. As seen in FIG. 8B, Layer1 was found to have an efficiency of about 81.5%; Layer2 was found to have an efficiency of about 83%; and Layer121 was found to have an efficiency of about 85%.

Example 3

Self-supporting, free standing electrode films were fabricated according to the disclosure. An Si—C trilayer electrode film was fabricated as follows: two active layers were fabricated, a first active layer and a second active layer. The first active layer (A) included 94% graphite, and 6% binder; the second active layer (B) included 89.5% graphite, 4.5% nano-sized silicon, and 6% binder. The binder for each electrode film included 3% weight CMC and 3% weight PTFE. Three identical prelayers were stacked and calendered to form the first active layer. An electrode film was formed by stacking a second active layer (B) between two first active layers (A) of 120 μm thickness. Thus, the order of active layers was: A-B-A. The resulting stacked active layers were calendered to form an electrode film. FIGS.

9A-9B provide capacity and efficiency data for the A-B-A trilayer stacked electrode film of Example 3.

Figure 9A:
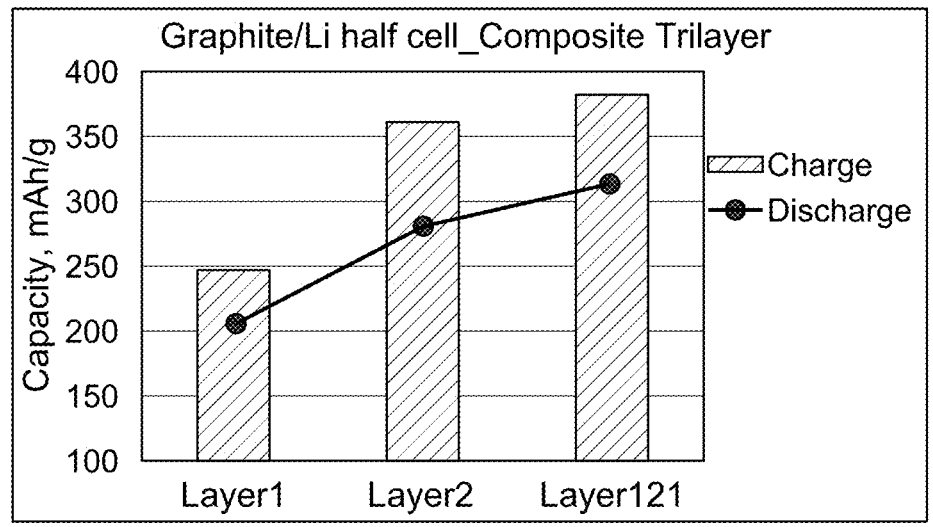
FIGS. 9A-9B depict capacity and efficiency, respectively, of individual layer graphite and trilayer composite electrode (according to Example 1) electrode films: layer A ("Layer1"), layer B ("Layer2"), and the Si—C three layer stacked electrode film ("Layer121").
Figure 9B:
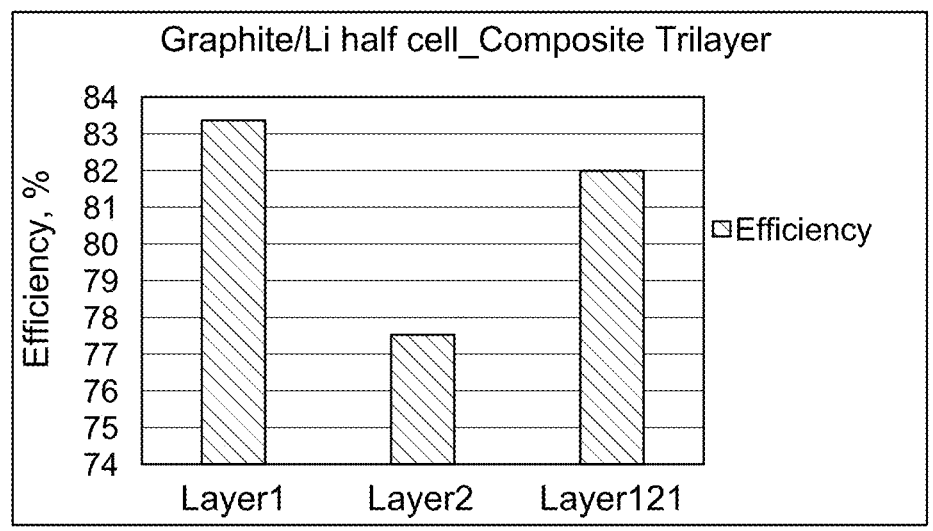

As seen in FIG. 9A, Layer1 was found to have a charge capacity of about 250 mAh/g and a discharge capacity of about 200 mAh/g; Layer2 was found to have a charge capacity of about 350 mAh/g and a discharge capacity of about 275 mAh/g; and Layer121 was found to have a charge capacity of about 375 mAh/g and a discharge capacity of about 300 mAh/g. As seen in FIG. 8B, Layer1 was found to have an efficiency of about 83.5%; Layer2 was found to have an efficiency of about 77.5%; and Layer121 was found to have an efficiency of about 82%.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A multilayer electrode film comprising:
  a first active layer comprising a first active material and a first binder, wherein the first active layer is a self-supporting film, and wherein the first active material comprises a metal oxide or a metal sulfide; and
  a second active layer comprising a second active material and a second binder, wherein the second active layer is a self-supporting film, and wherein the second active material comprises a metal oxide or a metal sulfide;

wherein the first and second active layers are stacked to form the multilayer electrode film;

wherein the multilayer electrode film is a free-standing film;

wherein the first and second active layers are substantially free of solvent residue;

wherein the multilayer electrode film has a thickness of at least 200 µm;

wherein the first active layer has a thickness of 120-250 µm and the second active layer has a thickness of 120-250 µm; and wherein the first active layer is immediately adjacent to the second active layer.

2. The multilayer electrode of claim 1, wherein the multilayer electrode film has a thickness of about 250-750 µm.

3. The multilayer electrode film of claim 1, wherein at least one of the type and amount of the first active material and the second active material is different between the first active layer and the second active layer.

4. The multilayer electrode film of claim 1, wherein at least one of the type and amount of the first binder and the second binder is different between the first active layer and the second active layer.

5. The multilayer electrode film of claim 1, wherein the first active layer and the second active layer have substantially the same compositions.

6. The multilayer electrode film of claim 1, further comprising a third active layer comprising a third active material and a third binder.

7. The multilayer electrode film of claim 1, wherein at least one of the first and second active material comprises at least one of sulfur and a material including sulfur.

8. A multilayer electrode comprising:
a current collector comprising a first side and a second side; and
the multilayer electrode film of claim 1 laminated to the first side of the current collector.

9. The multilayer electrode of claim 8, wherein the multilayer electrode film is laminated directly onto the first side of the current collector.

10. The multilayer electrode of claim 8, wherein an intervening adhesive layer is not provided between the multilayer electrode film and the current collector.

11. A double sided multilayer electrode comprising:
the multilayer electrode of claim 8; and
a second multilayer electrode film laminated to the second side of the current collector.

12. The double sided multilayer electrode of claim 11, wherein the first multilayer electrode film is of the opposite polarity as the second multilayer electrode film.

13. The double sided multilayer electrode of claim 11, wherein the first multilayer electrode film and the second multilayer electric film are symmetric with respect to each other.

14. The double sided multilayer electrode of claim 11, wherein the first multilayer electrode film and the second multilayer electrode film are asymmetric with respect to each other.

15. The double sided multilayer electrode of claim 14, wherein the first multilayer electrode film comprises a different number of layers than the second multilayer electrode film.

16. The double sided multilayer electrode of claim 14, wherein the active layer of the first multilayer electrode film that is immediately adjacent to the first side of the current collector has a different composition than the active layer of the second multilayer film that is immediately adjacent to the second side of the current collector.

17. The multilayer electrode of claim 1, wherein the first active material comprises lithium metal oxide.

18. The multilayer electrode of claim 17, wherein the lithium metal oxide is selected from the group consisting of: lithium nickel manganese cobalt oxide (NMC), lithium manganese oxide (LMO), lithium nickel manganese oxide (LNMO), lithium iron phosphate (LFP), lithium cobalt oxide (LCO), lithium titanate, and lithium nickel cobalt aluminum oxide (NCA) or combinations thereof.

19. The multilayer electrode of claim 1, wherein the second active material comprises lithium metal oxide.

20. The multilayer electrode of claim 19, wherein the lithium metal oxide is selected from the group consisting of: lithium nickel manganese cobalt oxide (NMC), lithium manganese oxide (LMO), lithium nickel manganese oxide (LNMO), lithium iron phosphate (LFP), lithium cobalt oxide (LCO), lithium titanate, and lithium nickel cobalt aluminum oxide (NCA) or combinations thereof.

21. The multilayer electrode of claim 1, further comprising an adhesive layer.

22. The multilayer electrode of claim 1, wherein the first and second active layers have substantially identical thicknesses.

* * * * *

UNITED STATES PATENT AND TRADEMARK OFFICE
CERTIFICATE OF CORRECTION

PATENT NO. : 11,990,278 B2  
APPLICATION NO. : 16/176420  
DATED : May 21, 2024  
INVENTOR(S) : Joon Ho Shin et al.

Page 1 of 2

It is certified that error appears in the above-identified patent and that said Letters Patent is hereby corrected as shown below:

In the Specification

In Column 13, Lines 3-4, delete "(trifluoromethansulfonyl)" and insert --(trifluoromethanesulfonyl)--.

In Column 13, Lines 4-5, delete "trifluoromethansulfonate" and insert --trifluoromethanesulfonate--.

In Column 13, Line 18, delete "0.8 M." and insert --0.8 M,--.

In Column 14, Line 22, delete "0.8 M." and insert --0.8 M,--.

In Column 21, Lines 53-54, delete "sub combination." and insert --subcombination.--.

In the Claims

In Column 23, Claim 2, Line 16, delete "multilayer electrode" and insert --multilayer electrode film--.

In Column 24, Claim 17, Line 24 (approx.), delete "multilayer electrode" and insert --multilayer electrode film--.

In Column 24, Claim 18, Line 26 (approx.), delete "multilayer electrode" and insert --multilayer electrode film--.

In Column 24, Claim 19, Line 34 (approx.), delete "multilayer electrode" and insert --multilayer electrode film--.

In Column 24, Claim 20, Line 36 (approx.), delete "multilayer electrode" and insert --multilayer electrode film--.

Signed and Sealed this  
Twenty-seventh Day of August, 2024

Katherine Kelly Vidal  
*Director of the United States Patent and Trademark Office*

CERTIFICATE OF CORRECTION (continued)
U.S. Pat. No. 11,990,278 B2

In Column 24, Claim 21, Line 43 (approx.), delete "multilayer electrode" and insert --multilayer electrode film--.

In Column 24, Claim 22, Line 45 (approx.), delete "multilayer electrode" and insert --multilayer electrode film--.